(12) United States Patent
Kuboyama et al.

(10) Patent No.: US 8,977,446 B2
(45) Date of Patent: Mar. 10, 2015

(54) DRIVING SUPPORT DEVICE

(75) Inventors: Tsuyoshi Kuboyama, Toyota (JP); Akira Someya, Kariya (JP); Keiichi Nakamura, Toyota (JP); Ryosuke Sasaki, Toyota (JP); Kazuya Watanabe, Anjo (JP); Daisuke Ohashi, Miyoshi (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 211 days.

(21) Appl. No.: 13/384,776

(22) PCT Filed: Jul. 22, 2009

(86) PCT No.: PCT/JP2009/003444
§ 371 (c)(1),
(2), (4) Date: Jan. 19, 2012

(87) PCT Pub. No.: WO2011/010346
PCT Pub. Date: Jan. 27, 2011

(65) Prior Publication Data
US 2012/0158256 A1    Jun. 21, 2012

(51) Int. Cl.
*G06F 7/00*    (2006.01)
*B62D 15/02*    (2006.01)

(52) U.S. Cl.
CPC ........ *B62D 15/0295* (2013.01); *B62D 15/0275* (2013.01)
USPC ...... 701/51; 340/435; 340/932.2; 340/995.21

(58) Field of Classification Search
CPC .............................. B60R 16/037; G06F 3/017
USPC ................. 701/1, 36, 41, 51; 340/435, 932.2, 340/995.21
See application file for complete search history.

(56) References Cited

U.S. PATENT DOCUMENTS 6,345,586 B1 *  2/2002 Okada ......................... 116/28 R
7,295,227 B1 * 11/2007 Asahi et al. ................... 348/118
(Continued)

FOREIGN PATENT DOCUMENTS

CN      1863694 A     11/2006
EP     2 079 053 A1    7/2009
(Continued)

OTHER PUBLICATIONS

International Search Report Issued Aug. 25, 2009 in PCT/JP09/03444 Filed Jul. 22, 2009.

*Primary Examiner* — John Q Nguyen
*Assistant Examiner* — Rodney P King
(74) *Attorney, Agent, or Firm* — Oblon, McClelland, Maier & Neustadt, L.L.P.

(57) ABSTRACT

Provided is a driving support device that allows a driver to confirm the travelling routes of the wheels of a vehicle from an image indicating the circumference of the vehicle.

The driving support device includes: an imaging unit which takes a travelling direction image by shooting in the travelling direction of a vehicle; a steering angle detection unit which detects the steering angle of the vehicle; a route image generation unit which predicts travelling routes of wheels provided on the travelling direction side of the vehicle, and generates a route image that indicates the travelling routes of the wheels as seen from the viewpoint of the imaging unit; a superimposed image generation unit which generates a superimposed image by superimposing the route image on the travelling direction image; and an image display unit which displays the superimposed image.

8 Claims, 13 Drawing Sheets

(56) References Cited

U.S. PATENT DOCUMENTS

| | | | |
|---|---|---|---|
| 2001/0030688 A1 | 10/2001 | Asahi et al. | |
| 2006/0293843 A1* | 12/2006 | Morita et al. | 701/207 |
| 2011/0106380 A1* | 5/2011 | Wang et al. | 701/36 |

FOREIGN PATENT DOCUMENTS

| | | |
|---|---|---|
| JP | 11 334470 | 12/1999 |
| JP | 2000 16325 | 1/2000 |
| JP | 2001 180405 | 7/2001 |
| JP | 2003 146133 | 5/2003 |
| JP | 2005 78414 | 3/2005 |
| JP | 2008 6995 | 1/2008 |
| JP | 2008 108219 | 5/2008 |
| JP | 2008 279883 | 11/2008 |
| JP | 2009 37457 | 2/2009 |

* cited by examiner

DRIVING SUPPORT DEVICE

TECHNICAL FIELD

The present invention relates to a driving support device, and more particularly, to a driving support device that displays an image indicating the circumference of a vehicle.

BACKGROUND ART

Conventionally, there has been developed a driving support device that takes an image indicating a blind spot for a driver with an imaging device such as a camera and displays the image inside the vehicle, so that the driver is supported so as to drive safely.

One of such driving support devices as described above is disclosed in Patent Literature 1. A drive supporting system disclosed in Patent Literature 1 combines an image taken with a camera provided on a road and an image taken with a camera provided on a vehicle, thereby displaying an image indicating the circumference of the vehicle to a driver.

CITATION LIST

Patent Literature

[PTL 1] Japanese Laid-Open Patent Publication No. 2009-37457

SUMMARY OF THE INVENTION

Problems to be Solved by the Invention

For example, when a vehicle is travelling on an off-road ground such as a rocky path or a gravel path, a driver of the vehicle needs to drive being careful about the travelling routes of the wheels so that the wheels will not enter a treacherous ground or will not run off. However, if the driver is not used to driving, it is difficult for the driver to accurately predict the travelling routes of the wheels sitting on the driver seat while driving. In the drive supporting system disclosed in Patent Literature 1, although a driver can roughly recognize the positions of obstacles and the like that have high probabilities of coming into contact with the vehicle from the image indicating the circumference of the vehicle, the driver cannot confirm the routes through which the wheels of the vehicle will travel.

The present invention has been made in view of the above problems, and an object of the present invention is to provide a driving support device that allows a driver to visually recognize the travelling routes of the wheels of a vehicle from an image indicating the circumference of the vehicle.

Solution to the Problems

In order to solve the above problems, the present invention employs the following configuration. That is, the first aspect of the present invention is a driving support device comprising: an imaging unit which takes a travelling direction image by shooting in the travelling direction of a vehicle; a steering angle detection unit which detects the steering angle of the vehicle; a route image generation unit which predicts travelling routes of wheels provided on the travelling direction side of the vehicle, and generates a route image that indicates the travelling routes of the wheels as seen from the viewpoint of the imaging unit by frame lines surrounding belt-like areas having widths corresponding to the widths of the wheels, the travelling routes extending to a predetermined distance in the travelling direction of the vehicle; a superimposed image generation unit which generates a superimposed image by superimposing the route image on the travelling direction image such that portions of the travelling direction image inside the frame lines are displayed; and an image display unit which displays the superimposed image, the predetermined distance is set such that the accuracy of the route image included in the superimposed image displayed by the image display unit is assured.

In the fifth aspect based on the first aspect, the route image generation unit generates the route image having guide lines at regular intervals from the travelling-direction-side end of the vehicle along the travelling routes.

In the sixth aspect based on the first aspect, the driving support device further comprises a ground determination unit which determines whether or not a ground on which the vehicle is travelling is an off-road ground. If the ground is an off-road ground, the route image generation unit generates the route image.

In the seventh aspect based on the sixth aspect, the ground determination unit includes a rotational velocity acquiring unit which acquires the rotational velocities of wheels provided on the vehicle. The ground determination unit calculates the difference between the rotational velocities of every combination of two of the wheels, and if the difference of at least one of the combinations is larger than a predetermined threshold value, determines that the ground on which the vehicle is travelling is an off-road ground.

In the eighth aspect based on the first aspect, the driving support device further comprises a forward traveling determination unit which determines whether or not a shift lever of the vehicle is set at a drive range. The imaging unit includes a front imaging unit which takes a front travelling direction image by shooting in the forward direction of the vehicle. The route image generation unit, if the shift lever of the vehicle is set at the drive range, generates a front wheel route image that indicates travelling routes of front wheels of the vehicle. The superimposed image generation unit, if the shift lever of the vehicle is set at the drive range, generates a front superimposed image by superimposing the front wheel route image onto the front travelling direction image. The image display unit, if the shift lever of the vehicle is set at the drive range, displays the front superimposed image.

In the ninth aspect based on the first aspect, the driving support device further comprises a backward traveling determination unit which determines whether or not a shift lever of the vehicle is set at a reverse range. The imaging unit includes a rear imaging unit which takes a rear travelling direction image by shooting in the backward direction of the vehicle. The route image generation unit, if the shift lever of the vehicle is set at the reverse range, generates a rear wheel route image that indicates travelling routes of rear wheels of the vehicle. The superimposed image generation unit, if the shift lever of the vehicle is set at the reverse range, generates a rear superimposed image by superimposing the rear wheel route image onto the rear travelling direction image. The image display unit, if the shift lever of the vehicle is set at the reverse range, displays the rear superimposed image.

In the tenth aspect based on the first aspect, the route image generation unit includes: a straight route calculation unit which, if the steering angle is directed in the straight direction of the vehicle, calculates the travelling routes of the wheels as belt-like areas extending along lines that pass through the wheels and are parallel to the straight direction, in a virtual space where the vehicle is present; a turning route calculation unit which, if the steering angle is directed in a direction other than the straight direction of the vehicle, calculates the center of a circle along which the vehicle turns, based on the steering angle, in the virtual space, and calculates the travelling routes of the wheels as belt-like areas extending along circles that pass through the wheels and are centered on the center, in the virtual space; and an image generation unit which generates the route image as seen from a viewpoint in the virtual space corresponding to the imaging unit, based on the travelling routes of the wheels calculated by the straight route calculation unit or the turning route calculation unit.

Advantageous Effects of the Invention

According to the first aspect, a driver of the vehicle can confirm the travelling routes of the wheels by viewing the superimposed image indicating the circumference of the vehicle and the travelling routes of the wheels. Therefore, for example, when the vehicle is travelling on a ground where there is a possibility of the wheels running off, a driver performs an operation of changing the steering angle while viewing the superimposed image, whereby the driver can easily take the travelling routes of the wheels that prevents the wheels from running off.

In addition, according to the first aspect, a driver can accurately recognize predicted portions of a ground where the wheels will come into contact with, from the superimposed image.

In addition, according to the first aspect, predicted portions of a ground where the wheels will come into contact with are not hidden by an image indicating the travelling routes. Therefore, a driver can accurately and visually recognize the condition of the portions.

In addition, according to the first aspect, only portions of the travelling routes having relatively high accuracy can be displayed on the superimposed image. In the route image, portions of the travelling routes farther from the vehicle are likely to have lower accuracy because of error in attachment of the imaging unit. Therefore, if the travelling routes to a predetermined distance are displayed, the accuracy of the displayed travelling routes can be assured.

According to the fifth aspect, a driver can accurately recognize a distance from each wheel to a target position, based on the guide lines indicated on the route image.

According to the sixth aspect, when the vehicle is travelling on a ground, such as an off-road ground, where a driver is likely to need to be careful about the travelling routes of the wheels, the travelling routes of the wheels can be automatically displayed.

According to the seventh aspect, it is possible to easily determine whether or not the vehicle is travelling on an off-road ground, with a decreased processing amount. Specifically, in the case where one of the wheels is assumed to be spinning, e.g., when the rotational velocity of one of the wheels is slower than the rotational velocities of the other wheels, it can be determined that the vehicle is travelling on an off-road ground.

According to the eighth aspect, a driver can confirm the travelling routes of the wheels provided on the front side of the vehicle. In addition, in the case where the shift lever is set at the drive range, the superimposed image in which the travelling routes of the front wheels are superimposed onto the image indicating an area in front of the vehicle is automatically displayed. Therefore, a driver can easily confirm the travelling routes of the wheels provided on the front side of the vehicle, by only performing shifting operation.

According to the ninth aspect, a driver can confirm the travelling routes of the wheels provided on the rear side of the vehicle. In addition, in the case where the shift lever is set at the reverse range, the superimposed image in which the travelling routes of the rear wheels are superimposed onto the image indicating an area in front of the vehicle is automatically displayed. Therefore, a driver can easily confirm the travelling routes of the wheels provided on the rear side of the vehicle, by only performing shifting operation.

According to the tenth aspect, the travelling routes of the wheels can be accurately calculated in accordance with the steering angle of the vehicle, and the travelling routes of the wheels can be accurately displayed on the superimposed image.

DESCRIPTION OF EMBODIMENTS

First Embodiment

Figure 1:
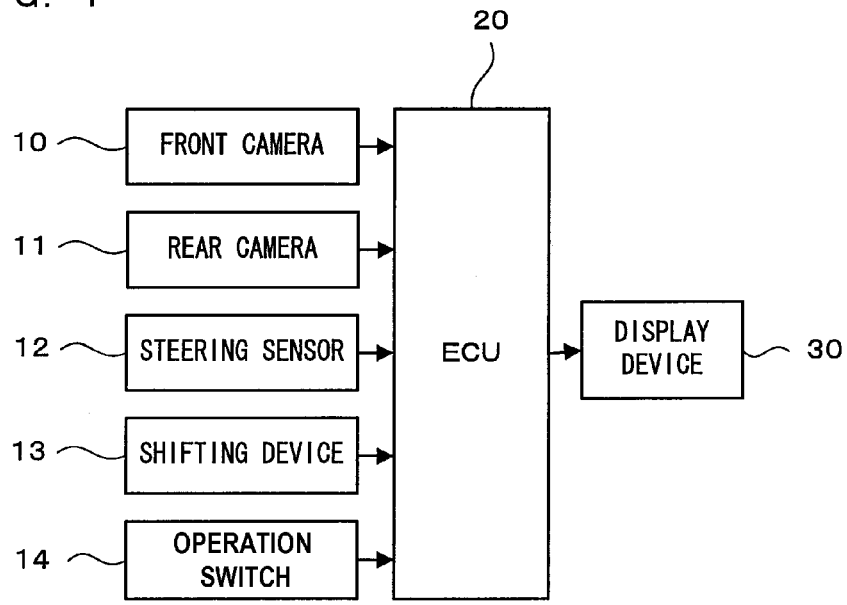
FIG. 1 shows a block diagram of an example of the configuration of a driving support device according to the first embodiment.

Hereinafter, a driving support device according to the first embodiment of the present invention will be described. First, with reference to FIG. 1, the configuration of the driving support device according to the first embodiment will be described. FIG. 1 shows a block diagram of an example of the configuration of the driving support device according to the first embodiment.

As shown in FIG. 1, the driving support device according to the first embodiment includes a front camera 10, a rear camera 11, a steering sensor 12, a shifting device 13, an operation switch 14, an ECU 20, and a display device 30. In the description below, it will be assumed that the driving support device is provided on the vehicle 100.

The front camera 10 is an imaging device that includes a general image sensor such as a CMOS (Complementary Metal Oxide Semiconductor) sensor or a CCD (Charge Coupled Device) sensor. The front camera 10 is provided at a position (for example, in front of a rear-view mirror or in the vicinity of a front grille) where the front camera can take an image of an area in front of the vehicle 100, and takes an image of an area in front of the vehicle 100 (hereinafter, referred to as a front image). The front camera 10 outputs the taken front image to the ECU 20.

The rear camera 11 is an imaging device that includes a general image sensor such as a CCD sensor. The rear camera 11 is provided at a position (for example, on a trunk lid or a back door) where the rear camera 11 can take an image of an area in back of the vehicle 100, and takes an image of an area in back of the vehicle 100 (hereinafter, referred to as a back image). The rear camera 11 outputs the taken back image to the ECU 20.

The steering sensor 12 is a sensor device that detects the steering angle of the vehicle 100. The steering sensor 12 outputs the detected steering angle to the ECU 20. It is noted that the vehicle 100 includes a steering device provided with a so-called Ackermann steering system.

The shifting device 13 is used for selecting the range of the transmission of the vehicle 100. The shifting device 13 outputs data indicating the range selected at the present to the ECU 20.

The operation switch 14 is an input device that receives an input operation from a driver. Specifically, the operation switch 14 is a switch device of press-type provided on a steering wheel or a center panel of the vehicle 100, for example. A driver can switch the mode of control executed by the ECU 20 between an on-road mode and an off-road mode, by operating the operation switch 14. The ECU 20 executes control processing in accordance with a mode selected by a driver, which will be described later in detail. It is noted that the operation switch 14 may be a conventional known input device such as a liquid crystal monitor having a touch panel, or a dial-type input device.

The ECU 20 is, typically, a control device that includes an information processing device such as a CPU (Central Processing Unit), a storage device such as a memory, an interface circuit, and the like. The ECU 20 outputs image data for supporting a driver's driving of the vehicle 100 to the display device 30, based on the data inputted from the front camera 10, the rear camera 11, the steering sensor 12, the shifting device 13, and the operation switch 14.

The display device 30 is, typically, a liquid crystal monitor, for example. The display device 30 is provided at a position such as an instrument panel of the vehicle 100 where a driver can visually recognize the display device 30, for example. The display device 30 displays the image data inputted from the ECU 20. It is noted that in the case where a navigation device having a display is provided in the vehicle 100, the display of the navigation device may be used as the display device 30.

Figure 2:
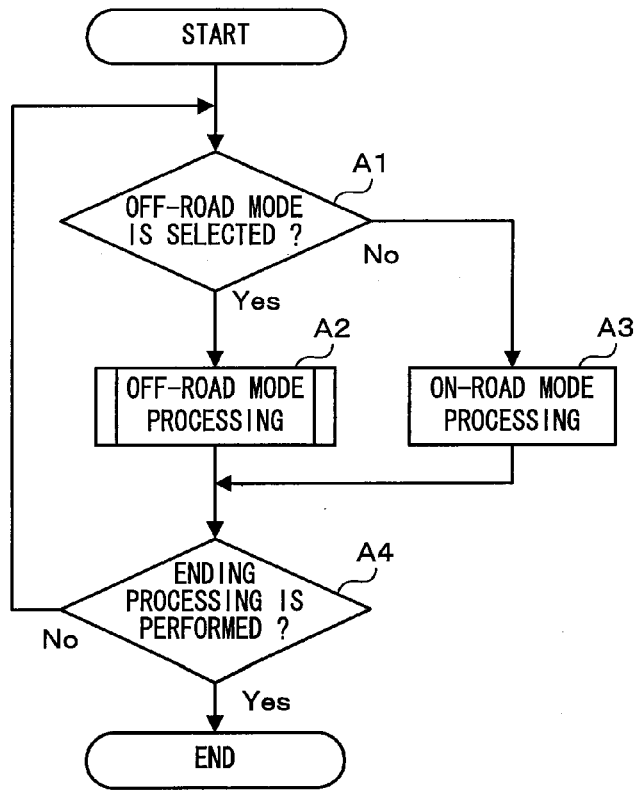
FIG. 2 shows an example of a flowchart of a process executed by an ECU 20 according to the first embodiment.

Next, with reference to FIG. 2, a process executed by the ECU 20 will be described. FIG. 2 shows an example of a flowchart of the process executed by the ECU 20 according to the first embodiment. For example, when an ignition switch of the vehicle 100 is turned on, the ECU 20 starts processing of step A1 shown in FIG. 2.

In step A1, the ECU 20 determines whether or not the off-road mode is selected. Specifically, the ECU 20 determines whether or not the off-road mode is selected in accordance with a signal inputted from the operation switch 14. For example, the ECU 20 displays a screen for selecting a mode, on the display device 30, in accordance with an input to the operation switch 14 from a driver, and receives the driver's operation of selecting a mode. Then, if the ECU 20 has determined that the off-road mode is selected, the process proceeds to step A2. On the other hand, if the ECU 20 has determined that the off-road mode is not selected, the process proceeds to step A3.

Figure 3:
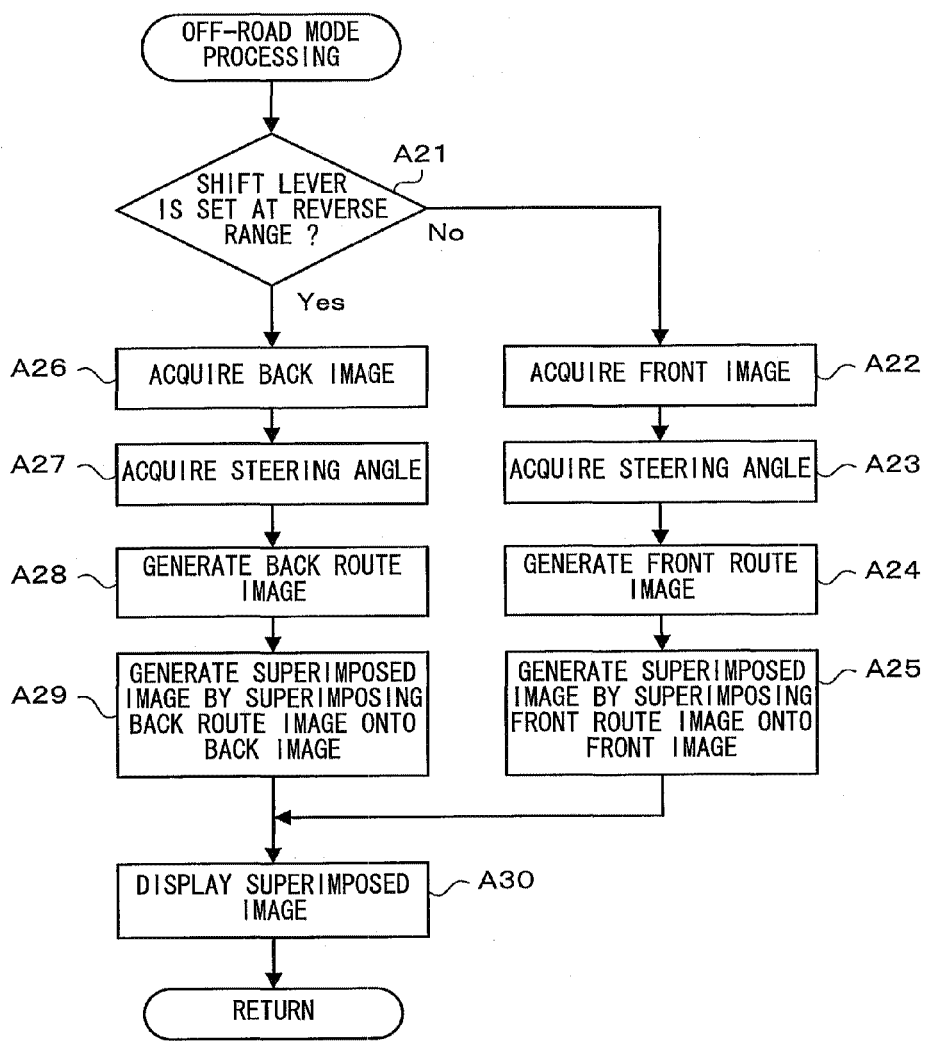
FIG. 3 shows an example of a flowchart of an off-road mode processing.

In step A2, the ECU 20 executes a subroutine of off-road mode processing. In the off-road mode processing, an image indicating the travelling route of the wheels of the vehicle 100 is displayed on the display device 30 so as to support a driver's driving. Hereinafter, with reference to FIG. 3, the details of the off-road mode processing will be described. FIG. 3 shows an example of a flowchart of the off-road mode processing. When the off-road mode processing is started, first, the ECU 20 executes processing of step A21.

In step A21, the ECU 20 determines whether or not the shift lever is set at the reverse range. Specifically, the ECU 20 determines whether or not the shift lever is set at the reverse range, based on data indicating the range set at the present, which is inputted from the shifting device 13. The transmission is set at the reverse range when the vehicle 100 travels backward. If the ECU 20 has determined that the shift lever is set at the reverse range, the process proceeds to step A26. On the other hand, if the ECU 20 has determined that the shift lever is set at a range other than the reverse range, the process proceeds to step A22.

Figure 4:
FIG. 4 shows an example of a front image.

In step A22, the ECU 20 acquires a front image. Specifically, the ECU 20 acquires a front image taken with the front camera 10. FIG. 4 shows an example of the front image. If the ECU 20 has completed the processing of step A22, the process proceeds to step A23.

In step A23, the ECU 20 acquires a steering angle. Specifically, the ECU 20 acquires the steering angle detected by the steering sensor 12. If the ECU 20 has completed the processing of step A23, the process proceeds to step A24.

Figure 5:
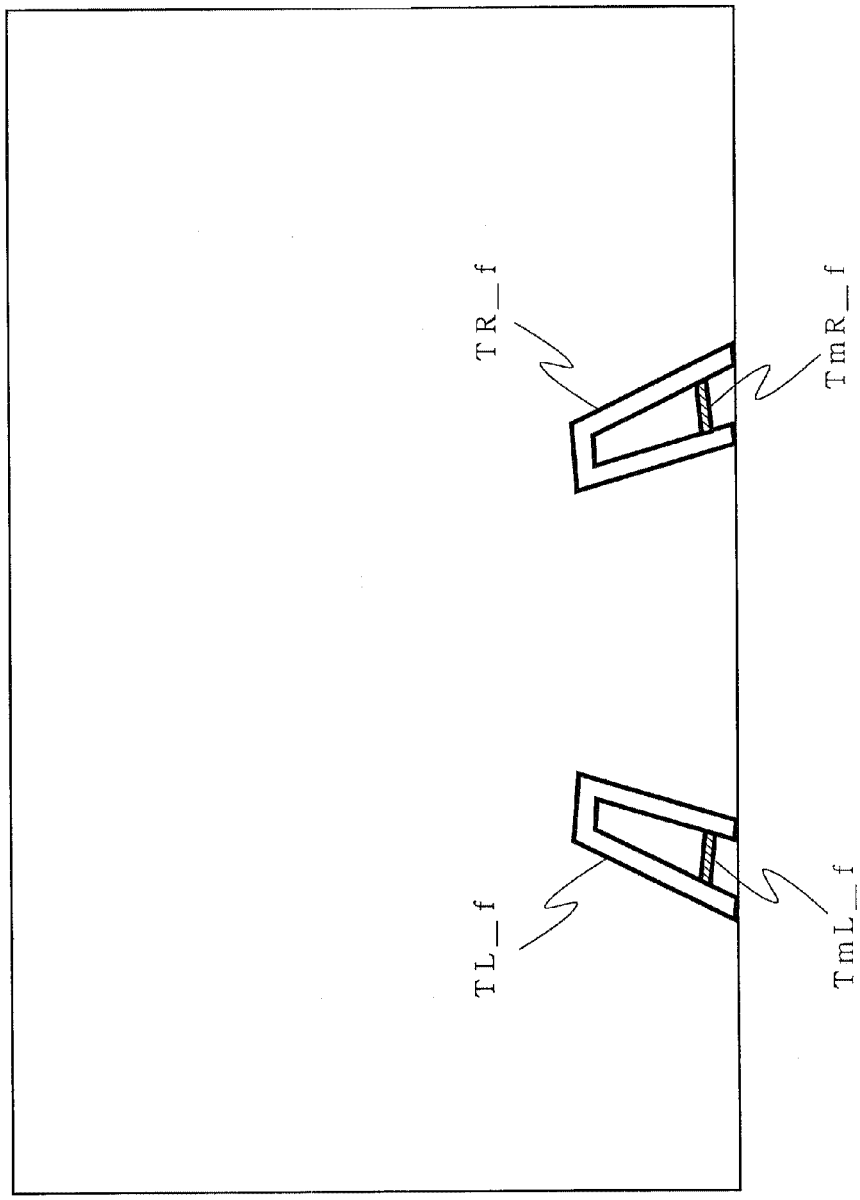
FIG. 5 shows an example of a front route image.

In step A24, the ECU 20 generates a front route image. The front route image indicates a predicted route through which a left front wheel 51 and a right front wheel 52 of the vehicle 100 will travel in the front image. FIG. 5 shows an example of the front route image. As shown in FIG. 5, the ECU 20 displays, as a belt-like area, the predicted route through which each of the left front wheel 51 and the right front wheel 52 of the vehicle 100 will travel. In FIG. 5, a left front wheel route TL_f represents the predicted route through which the left front wheel 51 will travel, and a right front wheel route TR_f represents the predicted route through which the right front wheel 52 will travel. Hereinafter, a method of generating the front route image will be described with reference to FIG. 6 to FIG. 8. In the description below, it will be assumed that the left front wheel 51, the right front wheel 52, a left rear wheel 53, and a right rear wheel 54 all have a width of W.

Figure 6:
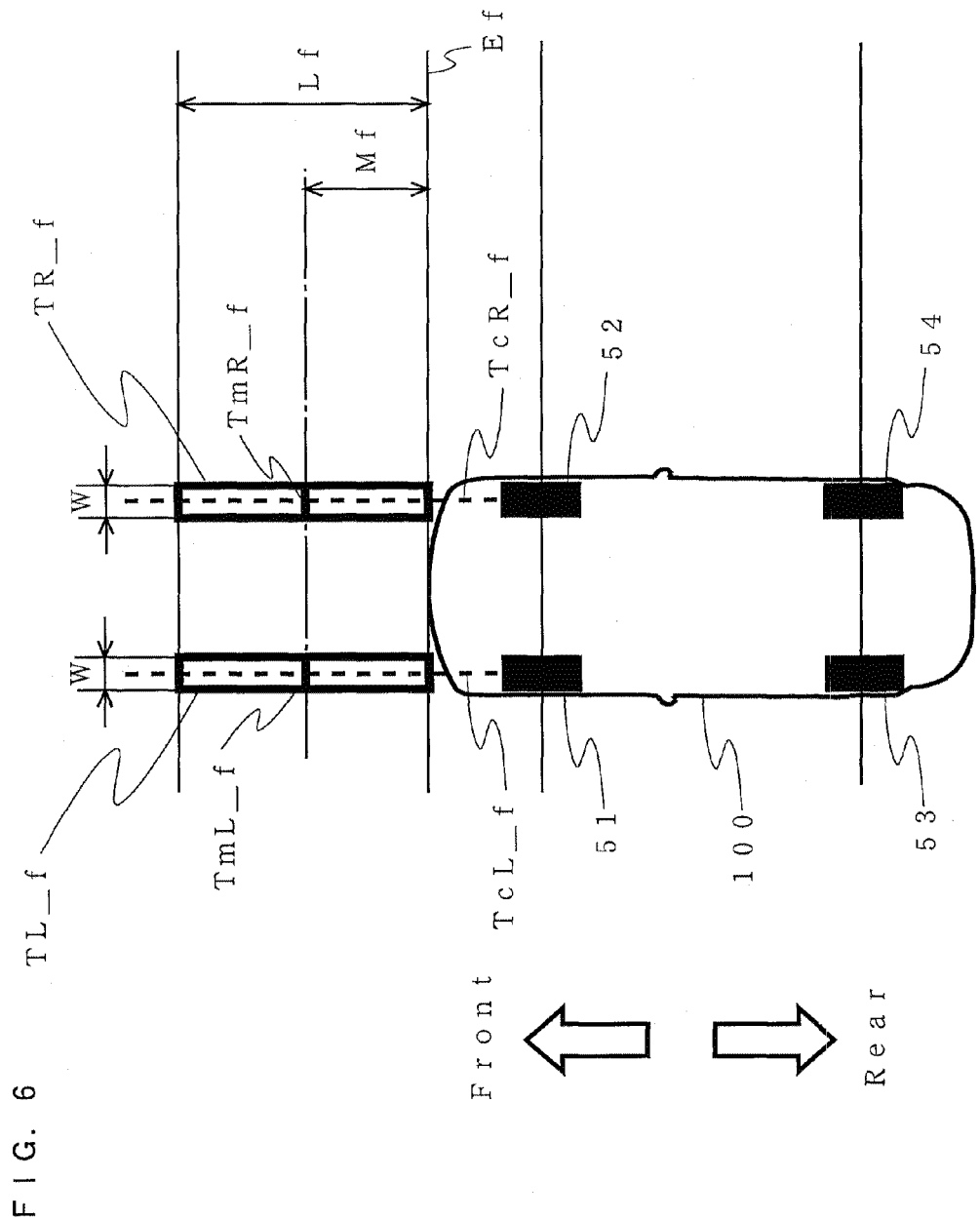
FIG. 6 is a plane view showing a left front wheel route TL_f and a right front wheel route TR_f in a virtual space in the case where the steering angle is directed in the straight direction of a vehicle 100.

First, the ECU 20 generates a virtual space in which the vehicle 100 is present. FIG. 6 is a plane view showing the left front wheel route TL_f and the right front wheel route TR_f in the virtual space in the case where the steering angle is directed in the straight direction of the vehicle 100. The ECU 20 calculates a left front wheel travelling line TcL_f that indicates the travelling direction of the left front wheel 51 in the plane view, and a right front wheel travelling line TcR_f that indicates the travelling direction of the right front wheel 52 in the plane view.

When the steering angle of the vehicle 100 is directed in the straight direction, the ECU 20 calculates the left front wheel travelling line TcL_f and the right front wheel travelling line TcR_f as lines parallel to an axis line indicating the straight direction of the vehicle 100, as shown in FIG. 6.

Figure 7:
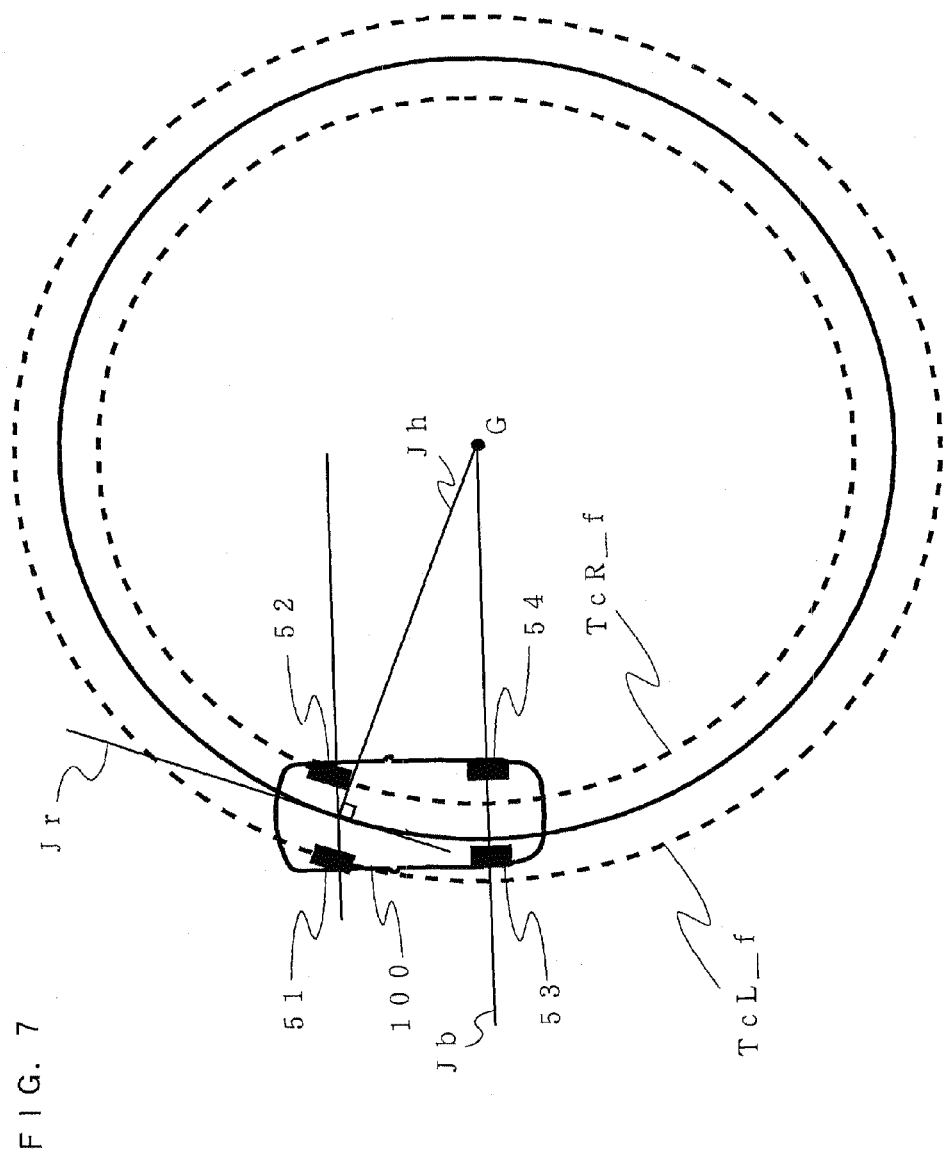
FIG. 7 is a plane view showing a left front wheel travelling line TcL_f and a right front wheel travelling line TcR_f in the case where the steering angle of the vehicle 100 is inclined rightward from the straight direction.

On the other hand, when the steering angle of the vehicle 100 is inclined rightward or leftward from the straight direction, first, the ECU 20 calculates, as a turning center G of the vehicle 100, an intersection of an axis line Jh perpendicular to an axis line Jr indicating the direction of the acquired steering angle, and an axis line Jb passing through the center of the left rear wheel 53 and the center of the right rear wheel 54 of the vehicle 100, as shown in FIG. 7. FIG. 7 is a plane view showing the left front wheel travelling line TcL_f and the right front wheel travelling line Tck_f in the case where the steering angle of the vehicle 100 is inclined rightward from the straight direction. The ECU 20 calculates, as the left front wheel travelling line TcL_f, a circle centered on the turning center G of the vehicle 100 and passing through the center of the left front wheel 51. Similarly, the ECU 20 calculates, as the right front wheel travelling line TcR_f, a circle centered on the turning center G of the vehicle 100 and passing through the center of the right front wheel 52.

Figure 8:
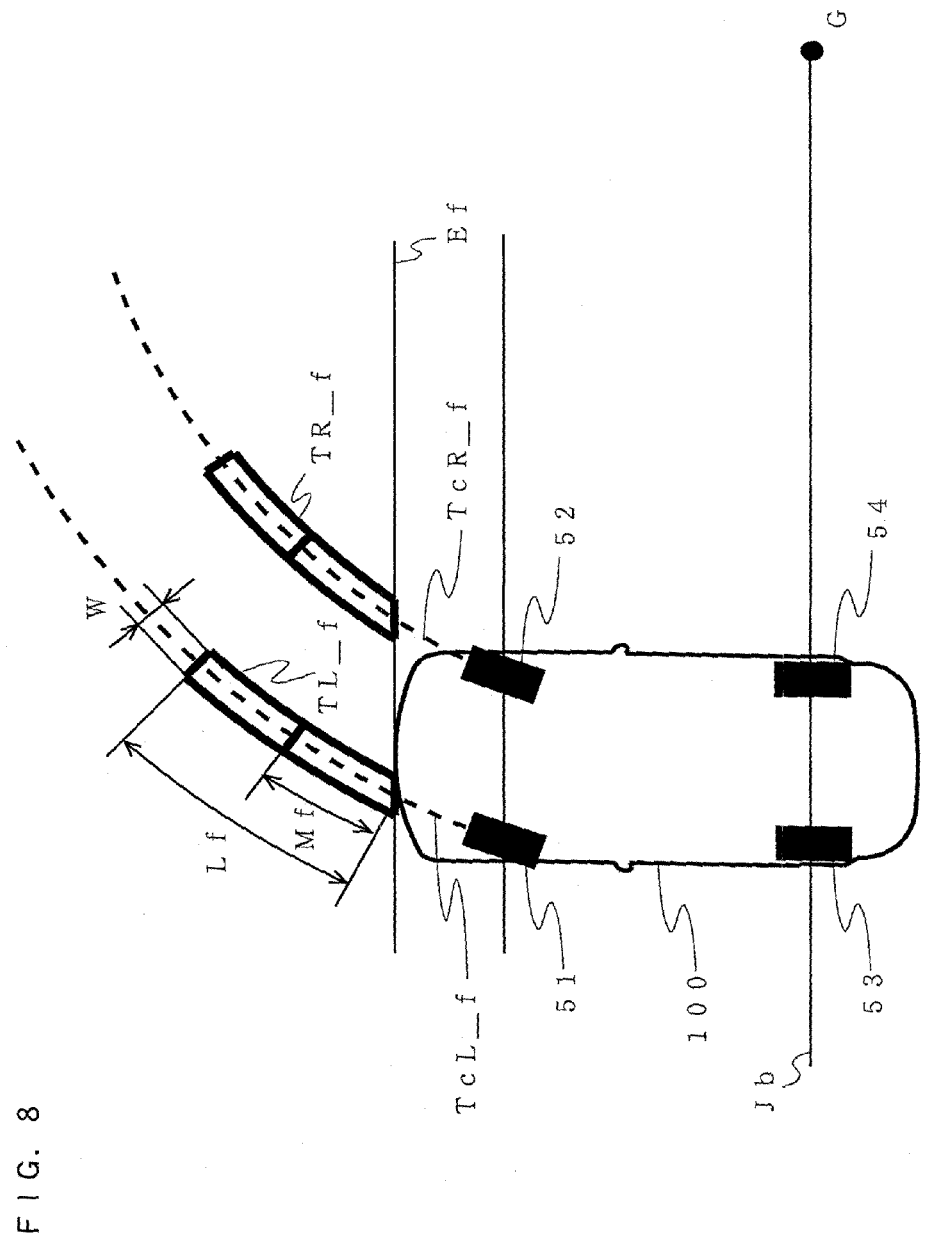
FIG. 8 is a plane view showing the left front wheel route TL_f and the right front wheel route TR_f in the virtual space in the case where the steering angle of the vehicle 100 is inclined rightward from the straight direction.

Next, the ECU 20 calculates, as the left front wheel route TL_f, a belt-like area whose center line coincides with the left front wheel travelling line TcL_f and which has the width W and extends to a predetermined distance Lf from a front end Ef of the vehicle 100, as shown in FIG. 6 and FIG. 8. Similarly, the ECU 20 calculates, as the right front wheel route TR_f, a belt-like area whose center line coincides with the right front wheel travelling line TcR_f and which has the width W and extends to the predetermined distance Lf from the front end Ef of the vehicle 100. FIG. 8 is a plane view showing the left front wheel route TL_f and the right front wheel route TR_f in the virtual space in the case where the steering angle of the vehicle 100 is inclined rightward from the straight direction. The distance Lf is a predetermined constant value, e.g., 1 (m). The width W is a predetermined constant value set in accordance with the width of the left front wheel 51 and the right front wheel 52, as described above. The ECU 20 draws areas indicating the left front wheel route TL_f and the right front wheel route TR_f in the virtual space, as frame lines surrounding the areas.

In the case where the steering angle is directed in a direction other than the straight direction, the ECU 20 calculates, as the left front wheel route TL_f and the right front wheel route TR_f, areas extending to the distance Lf from the front end Ef of the vehicle 100 along the circumferences represented by the left front wheel travelling line TcL_f and the right front wheel travelling line TcR_f, respectively.

Next, the ECU 20 draws a distance guide line TmL_f at a distance Mf from the front end Ef of the vehicle 100 in the area of the left front wheel route TL_f. Similarly, the ECU 20 draws a distance guide line TmR_f at the distance Mf from the front end Ef of the vehicle 100 in the area of the right front wheel route TR_f. It is noted that the distance Mf is a predetermined value smaller than the distance Lf. For example, the distance Mf is set at 0.5 (m).

Then, the ECU 20 generates a front route image indicating the positions, in the front image, of the left front wheel route TL_f, the distance guide line TmL_f, the right front wheel route TR_f, and the distance guide line TmR_f (see FIG. 5). Specifically, the ECU 20 generates, as the front route image, an image of the left front wheel route TL_f, the distance guide line TmL_f, the right front wheel route TR_f, and the distance guide line TmR_f drawn in the virtual space, taken from a viewpoint in the virtual space corresponding to the front camera 10. It is noted that the positional relationship between the virtual front camera 10 and the virtual vehicle 100 in the virtual space corresponds to the positional relationship between the real front camera 10 and the real vehicle 100. Through the above processing, the positions of the left front wheel route TL_f, the distance guide line TmL_f, the right front wheel route TR_f, and the distance guide line TmR_f are indicated in the front route image, as seen from the viewpoint of the front camera 10. If the ECU 20 has completed the processing of step A24, the process proceeds to step A25.

Figure 9:
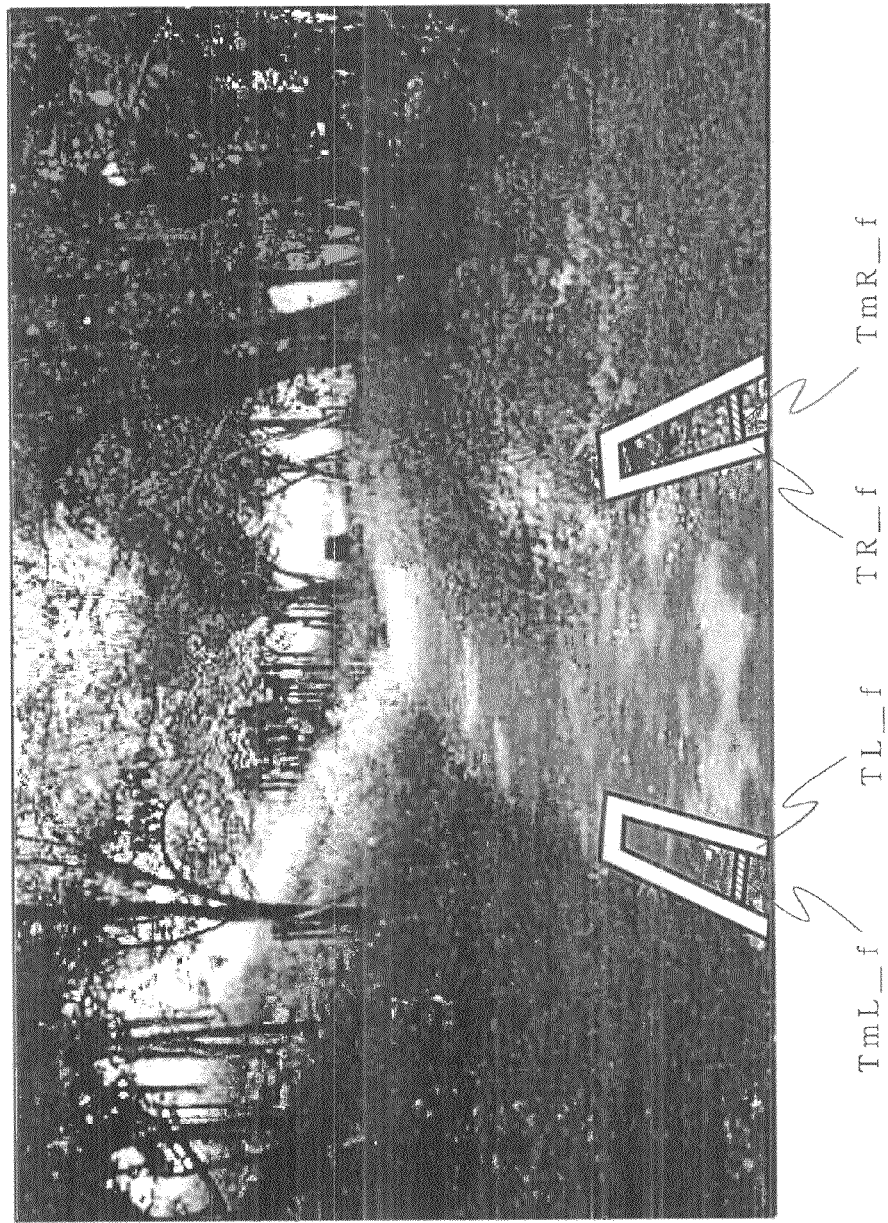
FIG. 9 shows an example of a superimposed image.

With reference to FIG. 3 again, in step A25, the ECU 20 generates a superimposed image by superimposing the front route image onto the front image. Specifically, the ECU 20 generates the superimposed image by drawing the front route image generated in step A24 on the front image acquired in step A22. For example, in the case where the ECU 20 acquires the front image shown in FIG. 4 in step A22 and generates the front route image shown in FIG. 5 in step A24, the ECU 20 superimposes the front route image onto the front image, thereby generating a superimposed image shown in FIG. 9. FIG. 9 shows an example of the superimposed image. Hereinafter, the superimposed image generated by superimposing the front route image onto the front image is referred to as a front superimposed image. If the ECU 20 has completed the processing of step S25, the process proceeds to step A30, in which the ECU 20 displays the superimposed image on the display device 30.

In the processing of steps A22 to A25 described above, as shown in FIG. 9, the left front wheel route TL_f and the right front wheel route TR_f are indicated as belt-like images having widths corresponding to the width of the left front wheel 51 and the widths the right front wheel 52, respectively. Therefore, the ECU 20 can accurately indicate predicted portions of the ground that the wheels will come into contact with, in the front image. In addition, the ECU 20 represents the areas indicating the left front wheel route TL_f and the right front wheel route TR_f, by frame lines surrounding the areas. Therefore, in the front superimposed image, a driver can visually recognize, through the areas, portions of the front image inside the areas. Therefore, a driver can accurately and visually recognize the conditions of predicted portions of the ground that the left front wheel 51 and the right front wheel 52 will come into contact with.

The distance guide line TmR_f and the distance guide line TmL_f indicating reference distances from the front end Ef of the vehicle 100 are displayed in the front superimposed image. Therefore, a driver can accurately recognize a distance from each of the left front wheel 51 and the right front wheel 52 to a target position, by viewing the front superimposed image.

In addition, in the front superimposed image, portions of the left front wheel route TL_f and the right front wheel route TR_f farther from the front end of the vehicle 100 have lower accuracy, because of the tolerance of attachment of the front camera 10. However, in the processing of step A24, the ECU 20 displays, as the left front wheel route TL_f and the right front wheel route TR_f, only portions, of the travelling routes of the left front wheel 51 and the right front wheel 52, from the front end of the vehicle 100 to the predetermined distance Lf. Therefore, the ECU 20 can indicate the travelling routes of the wheels in a range assuring the accuracy.

In the above processing, as an example, the ECU 20 indicates the distance guide line TmR_f and the distance guide line TmL_f at the distance Mf from the front end Ef of the vehicle 100. However, the ECU 20 may indicate a plurality of the distance guide lines TmR_f, and a plurality of the distance guide lines TmL_f at regular intervals from the front end Ef of the vehicle 100.

In addition, if the accuracy of the displayed routes can be assured, the ECU 20 may indicate the travelling routes of the left front wheel 51 and the right front wheel 52 extending to a longer distance than the distance Lf. In addition, if a driver does not need information about distance, the ECU 20 may not indicate the distance guide line TmR_f and the distance guide line TmL_f. In addition, if a driver needs only information about the travelling directions of the wheels, the ECU 20 may indicate the travelling routes of the wheels as line segments, instead of belt-like areas.

In step A26, the ECU 20 acquires the back image. Specifically, the ECU 20 acquires the back image taken with the rear camera 11. If the ECU 20 has completed the processing of step A26, the process proceeds to step A27.

In step A27, the ECU 20 acquires the steering angle in the same manner as in step A23. If the ECU 20 has completed the processing of step A27, the process proceeds to step A28.

In step A28, the ECU 20 generates a back route image. The back route image indicates a predicted route through which a left rear wheel 53 and a right rear wheel 54 of the vehicle 100 will travel in the back image. Hereinafter, the front route image and the back route image are collectively referred to as route images.

Specifically, first, the ECU 20 generates a virtual space in which the vehicle 100 is present, as in step A24. Then, the ECU 20 calculates a left rear wheel travelling line TcL_r that indicates the travelling direction of the left rear wheel 53 in the plane view, and a right rear wheel travelling line TcR_r that indicates the travelling direction of the right rear wheel 54 in the plane view.

Figure 10:
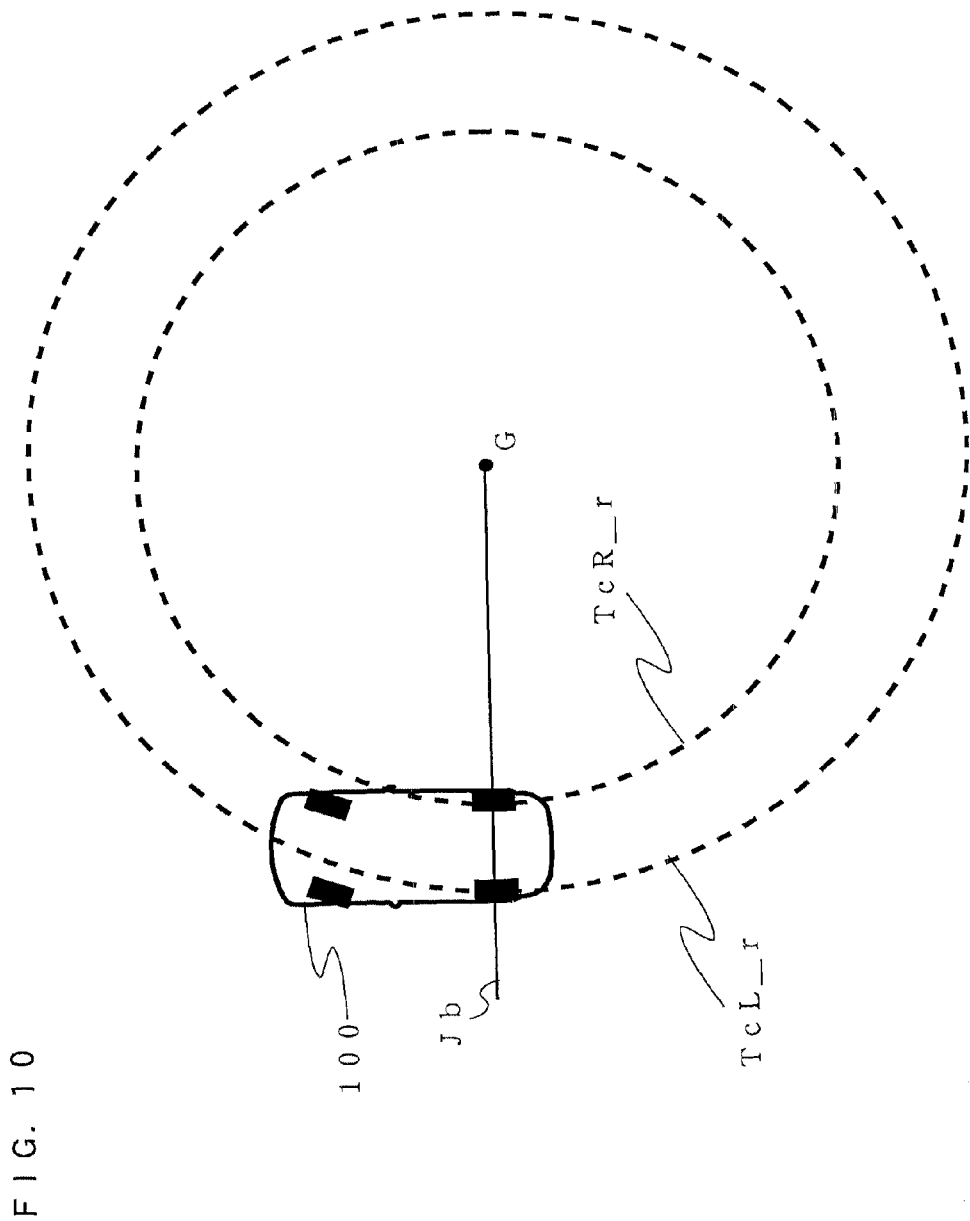
FIG. 10 is a plane view showing a left rear wheel travelling line TcL_r and a right rear wheel travelling line TcR_r in the case where the steering angle of the vehicle 100 is inclined rightward from the straight direction.

When the steering angle of the vehicle 100 is directed in the straight direction, the ECU 20 calculates the left rear wheel travelling line TcL_r and the right rear wheel travelling line TcR_r as lines parallel to an axis line indicating the straight direction of the vehicle 100. On the other hand, when the steering angle of the vehicle 100 is inclined rightward or leftward from the straight direction, the ECU 20 calculates the turning center G in the same manner as in step A24. Then, the ECU 20 calculates, as the left rear wheel travelling line TcL_r, a circle centered on the turning center G of the vehicle 100 and passing through the center of the left rear wheel 53, as shown in FIG. 10. Similarly, the ECU 20 calculates, as the right rear wheel travelling line TcR_r, a circle centered on the turning center G of the vehicle 100 and passing through the center of the right rear wheel 54. FIG. 10 is a plane view showing the left rear wheel travelling line TcL_r and the right rear wheel travelling line TcR_r in the case where the steering angle of the vehicle 100 is inclined rightward from the straight direction.

Figure 11:
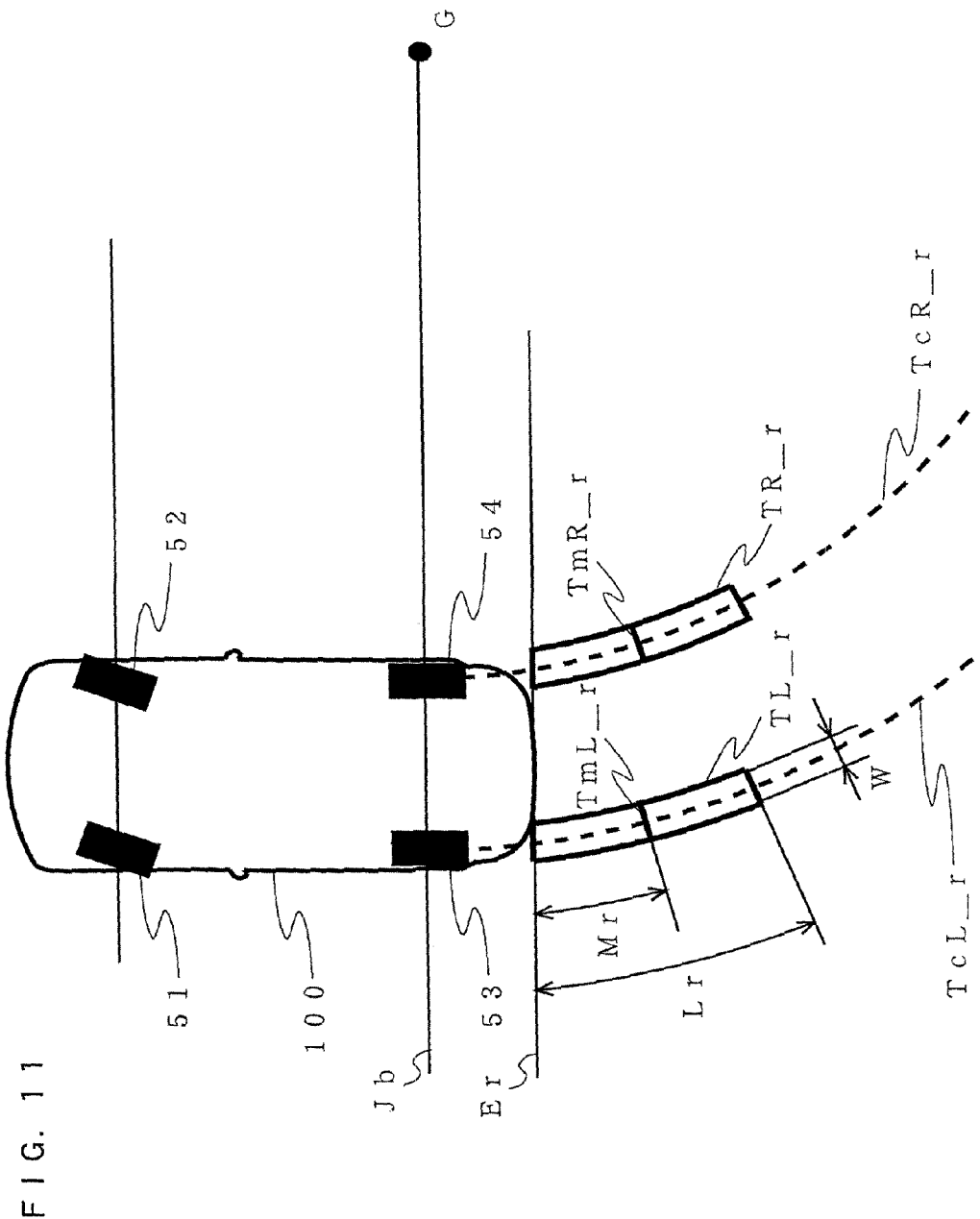
FIG. 11 is a plane view showing a left rear wheel route TL_r and a right rear wheel route TR_r in the virtual space in the case where the steering angle of the vehicle 100 is inclined rightward from the straight direction.

Next, the ECU 20 calculates, as a left rear wheel route TL_r, a belt-like area whose center line coincides with the left rear wheel travelling line TcL_r and which has the width W and extends to a predetermined distance Lr from a rear end Er of the vehicle 100, as shown in FIG. 11. Similarly, the ECU 20 calculates, as a right rear wheel route TR_r, a belt-like area whose center line coincides with the right rear wheel travelling line TcR_r and which has the width W and extends to the predetermined distance Lr from the rear end Er of the vehicle 100. FIG. 11 is a plane view showing the left rear wheel route TL_r and the right rear wheel route TR_r in the virtual space in the case where the steering angle of the vehicle 100 is inclined rightward from the straight direction. The distance Lr is a predetermined constant value, e.g., 1 (m). The ECU 20 draws areas indicating the left rear wheel route TL_r and the right rear wheel route TR_r in the virtual space, as frame lines surrounding the areas.

Next, the ECU 20 draws a distance guide line TmL_r at a distance Mr from the rear end Er of the vehicle 100 in the area of the left rear wheel route TL_r. Similarly, the ECU 20 draws a distance guide line TmR_r at the distance Mr from the rear end Er of the vehicle 100 in the area of the right rear wheel route TR_r. It is noted that the distance Mr is a predetermined value smaller than the distance Lr. For example, the distance Mr is set at 0.5 (m).

Then, the ECU 20 generates a rear route image indicating the positions, in the rear image, of the left rear wheel route TL_r, the distance guide line TmL_r, the right rear wheel route TR_r, and the distance guide line TmR_r. Specifically, the ECU 20 generates, as the rear route image, an image of the left rear wheel route TL_r, the distance guide line TmL_r, the right rear wheel route TR_r, and the distance guide line TmR_r drawn in the virtual plane view, taken from a viewpoint in the virtual space corresponding to the rear camera 11. It is noted that the positional relationship between the virtual rear camera 11 and the virtual vehicle 100 in the virtual space corresponds to the positional relationship between the real rear camera 11 and the real vehicle 100. Through the above processing, the positions of the left rear wheel route TL_r, the distance guide line TmL_r, the right rear wheel route TR_r, and the distance guide line TmR_r are indicated in the rear route image, as seen from the viewpoint of the rear camera 11. If the ECU 20 has completed the processing of step A28, the process proceeds to step A29.

In the above example, in steps A24 and A28, the ECU 20 generates the route images by taking images of the routes of the wheels drawn in the virtual space from the viewpoints of the front camera 10 and the rear camera 11. However, the ECU 20 may calculate position coordinates indicating the routes of the wheels in the virtual space, and generate the route images based on the position coordinates. Specifically, a conversion equation that indicates the correspondence relationship between position coordinates in the virtual space and a pixel in the image taken with each of the front camera 10 and the rear camera 11 is stored in advance in the ECU 20. The ECU 20 generates the route images based on the position coordinates indicating the routes of the wheels, and the conversion equation.

Alternatively, in steps A24 and A28, the ECU 20 may acquire the route images by loading route images corresponding to the current steering angle from a storage device. In this case, the ECU 20 stores a plurality of route images corresponding to the respective steering angles in the storage device in advance.

The above calculation methods for the routes of the wheels in steps A24 and A28 are merely examples. The ECU 20 may calculate the routes of the wheels by using any conventional known method.

With reference to FIG. 3 again, in step A29, the ECU 20 generates a superimposed image by superimposing the rear route image onto the rear image. Specifically, the ECU 20 generates the superimposed image by drawing the rear route image generated in step A28 on the rear image acquired in step A26. Hereinafter, the superimposed image generated by superimposing the rear route image onto the rear image is referred to as a rear superimposed image. If the ECU 20 has completed the processing of step S25, the process proceeds to step A30, in which the ECU 20 displays the superimposed image on the display device 30.

In step A30, the ECU 20 displays the superimposed image. Specifically, the ECU 20 outputs the front superimposed image generated in step A25 or the back superimposed image generated in step A29 to the display device 30. If the ECU 20 has completed the processing of step A30, the process proceeds to step A4 in FIG. 2.

In the off-road mode processing described above, if the shift lever is set at a range other than the reverse range (for example, the shift lever is set at the drive range, the park range, or the neutral range), the ECU 20 displays the front superimposed image indicating the travelling routes of the left front wheel 51 and the right front wheel 52. If the shift lever is set at the reverse range, the ECU 20 displays the back superimposed image indicating the travelling routes of the left rear wheel 53 and the right rear wheel 54. That is, a driver can display the superimposed image indicating the travelling routes of the wheels provided on the travelling direction side, on the display device 30, by shifting the range of the shifting device 13, without switching the display screen of the display device 30.

The ECU 20 may execute the processing of steps A22 to A25 only when the shift lever is set at the drive range. That is, the ECU 20 may perform control processing so as not to automatically display the front superimposed image when the range of the shifting device 13 is neutral.

Irrespective of the setting of the range of the shifting device 13, the ECU 20 may select one of the front superimposed image and the back superimposed image in accordance with an instruction from a driver, and display the selected one on the display device 30. For example, the ECU 20 may perform control processing such that, when the ECU 20 displays a screen for selecting the front camera 10 or the rear camera 11 on the display device 30, and when a driver has selected the rear camera 11, the back superimposed image is displayed on the display device 30, even if the shifting device 13 is set at the drive range. Alternatively, the ECU 20 may display the front superimposed image and the back superimposed image being arranged on the display device 30 at the same time.

With reference to FIG. 2 again, in step A3, the ECU 20 executes on-road mode processing. The on-road mode processing is the off-road mode processing from which steps A23, A24, A27, and A28 are removed. Specifically, the ECU 20 outputs the front image or the back image to the display device 30 without generating the front route image or the back route image. It is noted that the ECU 20 may execute any conventional known processing relevant to the driving support of vehicles, as the on-road mode processing. For example, in the case where the vehicle 100 has cameras on the right side and the left side thereof, the ECU 20 may execute processing of superimposing images taken with the cameras on the right side and the left side onto the front image, and outputting the resultant superimposed image to the display device 30. If the ECU 20 has completed the processing of step A3, the process proceeds to step A4.

In step A4, the ECU 20 determines whether or not ending processing has been performed. Specifically, the ECU 20 determines whether or not the ignition switch of the vehicle 100 has been turned off. If the ECU 20 has determined that the ignition switch of the vehicle 100 has been turned off, the ECU 20 determines that the ending processing has been performed, and ends the process of the flowchart shown in FIG. 2. On the other hand, if the ECU 20 has determined that the ignition switch of the vehicle 100 has not been turned off, the ECU 20 determines that the ending processing has not been performed, and the process returns to step A1.

Figure 12:
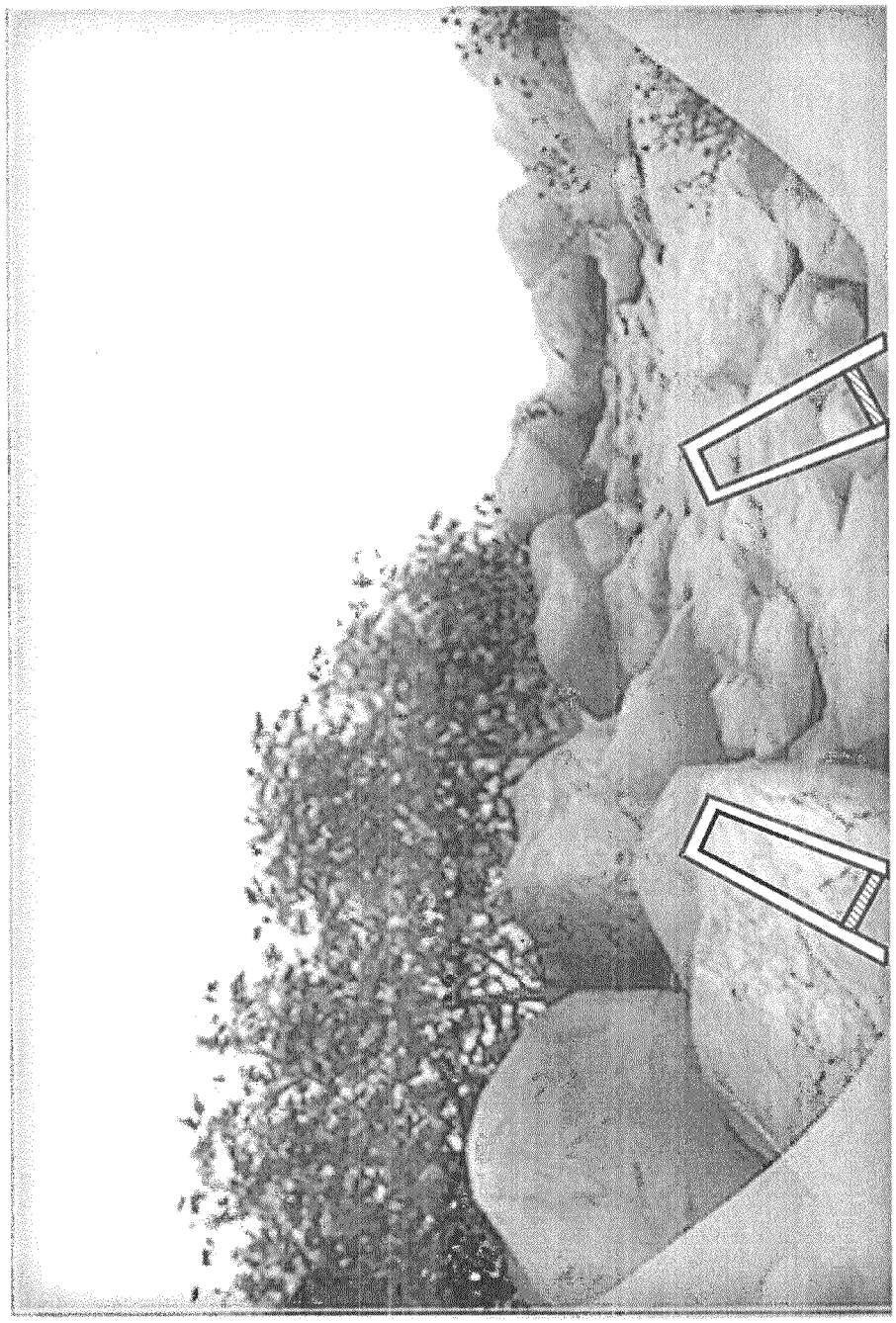
FIG. 12 shows an example of the superimposed image in the case where the vehicle travels on a rocky path.

Thus, the driving support device according to the first embodiment of the present invention allows a driver of the vehicle 100 to confirm the travelling routes of the wheels of the vehicle 100 by viewing the superimposed image indicating the circumference of the vehicle 100 and the travelling routes. Therefore, the driving support device according to the first embodiment of the present invention is useful especially in the case where a driver needs to drive while predicting a portion of the ground that each wheel will come into contact with, e.g., when the vehicle 100 is travelling on a wild rocky path or the like. When the vehicle is travelling on a wild rocky path or the like, a driver drives while confirming the travelling routes of the wheels of the vehicle 100 by a superimposed image as shown in FIG. 12, whereby the driver can drive while preventing the wheels from running off, for example.

In the first embodiment, as an example, the ECU 20 represents the belt-like areas indicating the travelling routes of the wheels in the superimposed image, by frame lines. However, the ECU 20 may represent the travelling routes of the wheels in the superimposed image, by lines.

In the first embodiment, as an example, the left front wheel 51, the right front wheel 52, the left rear wheel 53, and the right rear wheel 54 all have the width of W, and the ECU 20 sets the widths of the travelling routes of the wheels indicated in the route image, in accordance with the width W. However, in the case where the wheels have widths different from each other, the ECU 20 may set the widths of the travelling routes of the wheels in accordance with the respective widths of the wheels. Specifically, in the case where the left front wheel 51 and the right front wheel 52 have widths of W1 and W2, respectively, the ECU 20 may calculate the width of the left front wheel route TL_f in accordance with the width W1, and calculate the width of the right front wheel route TR_f in accordance with the width W2.

Second Embodiment

In the first embodiment, as an example, when a driver has selected the off-road mode, the ECU 20 executes the off-road mode processing. However, the ECU 20 may automatically determine whether or not the vehicle 100 is travelling on an off-road ground, and execute the off-road mode processing without waiting for a driver's operation. Hereinafter, a driving support device according to the second embodiment will be described.

Figure 13:
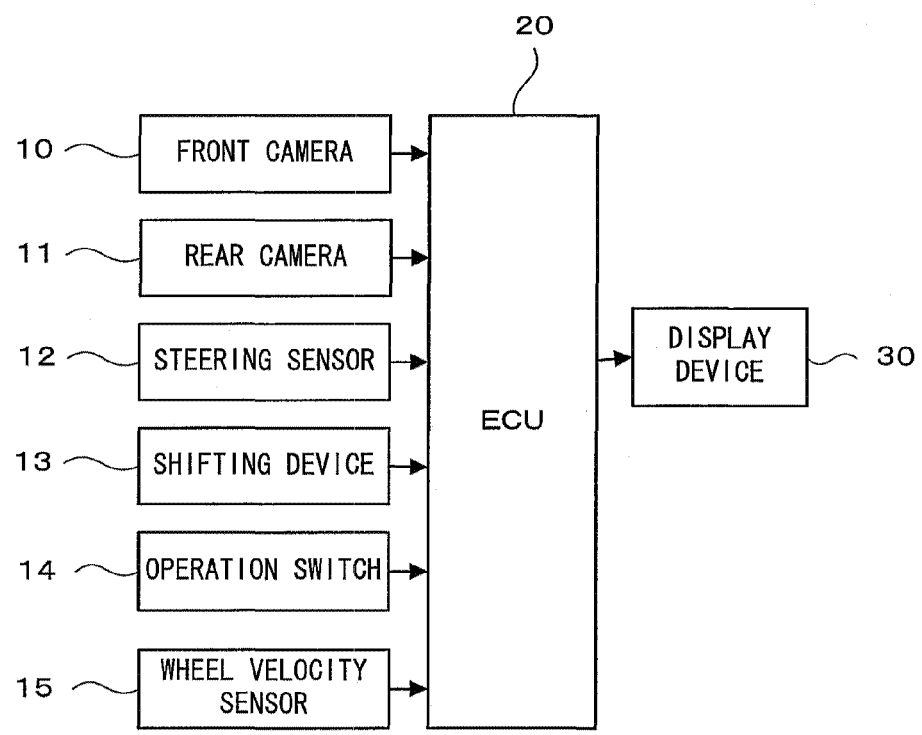
FIG. 13 shows a block diagram of an example of the configuration of a driving support device according to the second embodiment.

First, the configuration of the driving support device according to the second embodiment will be described. FIG. 13 is a block diagram showing an example of the configuration of the driving support device according to the second embodiment. The driving support device according to the second embodiment includes a wheel velocity sensor 15 in addition to the front camera 10, the rear camera 11, the steering sensor 12, the shifting device 13, the operation switch 14, the ECU 20, and the display device 30.

The wheel velocity sensor 15 is a measuring device for detecting the rotational velocities of the wheels of the vehicle 100. The wheel velocity sensor 15 detects a rotational velocity V1 of the left front wheel 51, a rotational velocity V2 of the right front wheel 52, a rotational velocity V3 of the left rear wheel 53, and a rotational velocity V4 of the right rear wheel 54, and outputs data indicating the detected values to the ECU 20. It is noted that the rotational velocity V1, the rotational velocity V2, the rotational velocity V3, and the rotational velocity V4 may be angular velocities or circumferential velocities of the respective wheels.

It is noted that the components other than the wheel velocity sensor 15 are the same as those of the driving support device of the first embodiment. Therefore, the detailed description thereof will be omitted.

Figure 14:
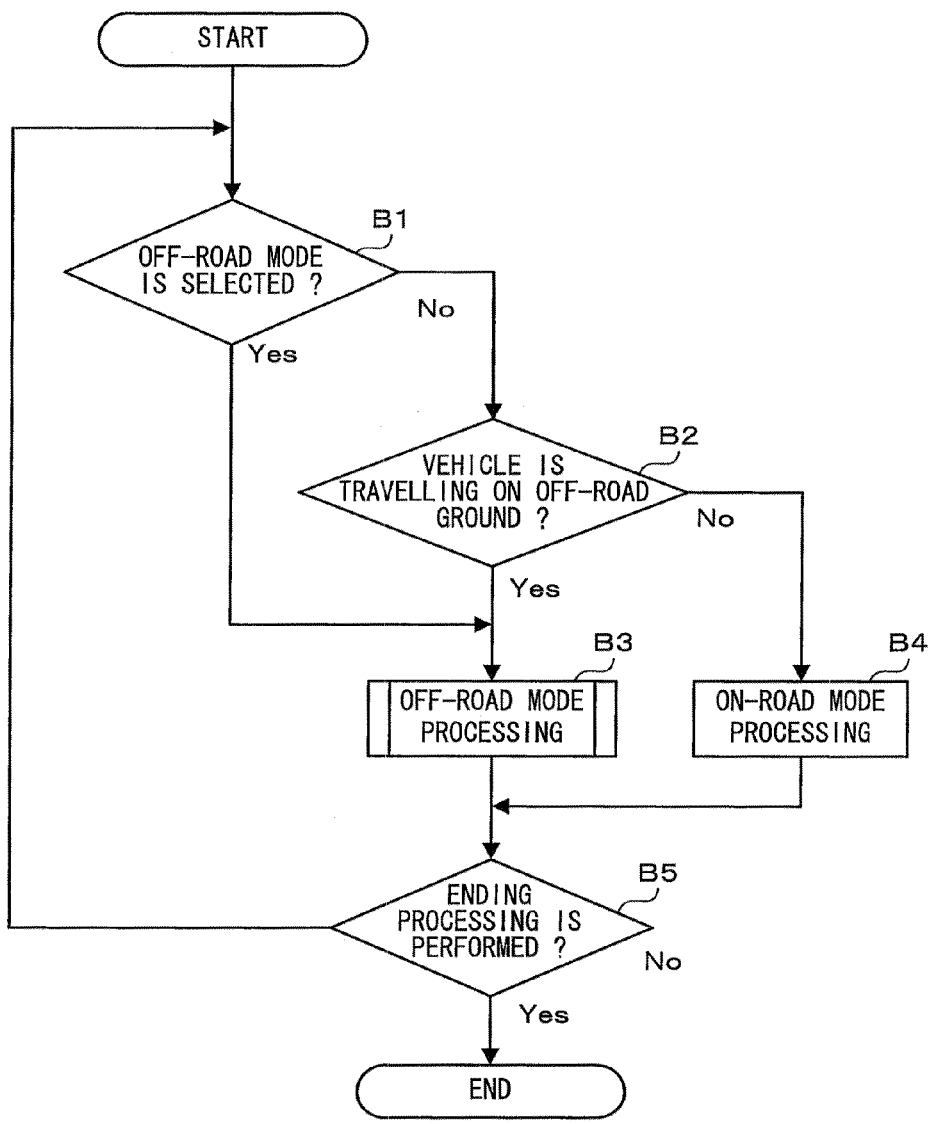
FIG. 14 shows an example of a flowchart of a process executed by an ECU 20 according to the second embodiment.

Next, with reference to FIG. 14, a process executed by the ECU 20 according to the second embodiment will be described. FIG. 14 is an example of a flowchart of the process executed by the ECU 20 according to the second embodiment. For example, when an ignition switch of the vehicle 100 is turned on, the ECU 20 starts processing of step B1 shown in FIG. 14.

In step B1, the ECU 20 determines whether or not the off-road mode is selected, in the same manner as in step A1 described above. If the ECU 20 has determined that the off-road mode is selected, the process proceeds to step B3. On the other hand, if the ECU 20 has determined that the off-road mode is not selected, the process proceeds to step B2.

In step B2, the ECU 20 determines whether or not the vehicle 100 is travelling on an off-road ground. Specifically, the ECU 20 acquires the rotational velocity V1, the rotational velocity V2, the rotational velocity V3, and the rotational velocity V4 from the wheel velocity sensor 15, and calculates the differences among the rotational velocities. The ECU 20 determines whether or not the differences are all equal to or smaller than a predetermined threshold value. If at least one of the differences continues to be larger than the predetermined threshold value during a predetermined time or longer, the ECU 20 determines that one of the wheels is spinning. If the ECU 20 has determined that one of the wheels is spinning, the ECU 20 determines that the vehicle 100 is travelling on an off-road ground, and the process proceeds to step B3. On the other hand, if the differences are all equal to or smaller than the predetermined threshold value, the ECU 20 determines that the left front wheel 51, the right front wheel 52, the left rear wheel 53, and the right rear wheel 54 are all in contact with the ground. If the ECU 20 has determined that the left front wheel 51, the right front wheel 52, the left rear wheel 53, and the right rear wheel 54 are all in contact with the ground, the ECU 20 determines that the vehicle 100 is not travelling on an off-road ground, and the process proceeds to step B4.

In step B3, the ECU 20 executes the same subroutine of the off-road mode processing as in FIG. 3. If the ECU 20 has completed the processing of step B3, the process proceeds to step B5.

In step B4, the ECU 20 executes the on-road mode processing as in step A3. If the ECU 20 has completed the processing of step B4, the process proceeds to step B5.

In step B5, the ECU 20 determines whether or not the ending processing has been performed, as in step A4. If the ECU 20 has determined that the ending processing has been performed, the ECU 20 ends the process of the flowchart shown in FIG. 14. On the other hand, if the ECU 20 has determined that the ending processing has not been performed, the process returns to step B1, and the ECU 20 repeats the processing of steps B1 to B4.

In the driving support device according to the second embodiment, if the ECU 20 has determined that the vehicle 100 is travelling on an off-road ground, the ECU 20 automatically executes the off-road mode processing. Therefore, when the vehicle 100 is travelling on a ground, such as an off-road ground, where a driver is likely to need to be careful about the travelling routes of the wheels, the superimposed image is automatically displayed and the driver can confirm the travelling routes of the wheels, without operation of switching the mode.

If a mode other than the off-road mode is intentionally selected by a driver's operation, the ECU 20 may omit the processing of step B2.

In the above embodiments, as an example, the ECU 20 represents areas indicating the travelling routes of the wheels by frame lines such that the surface of the ground is visible through the insides of the areas. The ECU 20 may display the frame lines with any color, shape, or pattern as long as the areas can be indicated. The ECU 20 may fill the insides of the areas indicating the travelling routes of the wheels with a given color or pattern. The ECU 20 may display a route image as a semi-transparent image on the superimposed image so that a camera image can be viewed through the route image.

In the above embodiments, as an example, if the ECU 20 has detected that the off-road mode is selected, the ECU 20 immediately executes the off-road mode processing. However, the ECU 20 may display the superimposed image only when a driver has performed a predetermined operation after the driver has selected the off-road mode. For example, the ECU 20 may display the superimposed image only when the differential is locked or the setting of the transfer is changed after the ECU 20 has detected that the off-road mode is selected.

In the above embodiments, as an example, the driving support device is provided in a four-wheeled vehicle. However, the driving support device may be provided in a vehicle having any number of wheels such as a three-wheeled vehicle or a trailer having more than four wheels.

INDUSTRIAL APPLICABILITY

The driving support device according to the present invention is useful for a driving support device that allows a driver to visually recognize the travelling routes of the wheels of a vehicle from an image indicating the circumference of the vehicle.

DESCRIPTION OF THE REFERENCE CHARACTERS

10 front camera
11 rear camera
12 steering sensor
13 shifting device
14 operation switch
15 wheel velocity sensor
20 ECU
30 display device
51 left front wheel
52 right front wheel
53 left rear wheel
54 right rear wheel
100 vehicle

The invention claimed is:
1. A driving support device comprising:
an imaging unit which takes a travelling direction image by shooting in the travelling direction of a vehicle;
a steering angle detection unit which detects the steering angle of the vehicle;
a route image generation unit which predicts travelling routes of wheels provided on the travelling direction side of the vehicle based on the steering angle, and generates a route image that indicates the travelling routes of the wheels as seen from the viewpoint of the imaging unit by frame lines surrounding belt-like areas having widths corresponding to the widths of the wheels, the travelling routes of the route image extending to a predetermined distance in the travelling direction of the vehicle;
a superimposed image generation unit which generates a superimposed image by superimposing the route image on the travelling direction image such that portions of the travelling direction image inside the frame lines are displayed; and
an image display unit which displays the superimposed image, wherein the predetermined distance is a distance determined based on a tolerance of attachment of the imaging unit to the vehicle, and the route image generation unit generates the route image such that an image representing a traveling route of a right wheel and an image representing a traveling route of a left wheel extend from an end of the vehicle in the travelling direction by a same distance when the steering angle of the vehicle is directed in a straight forward direction of the vehicle and when the steering angle of the vehicle is directed in a direction other than the straight forward direction.

2. The driving support device according to claim 1, wherein the route image generation unit generates the route image having guide lines at regular intervals from the travelling-direction-side end of the vehicle along the travelling routes.

3. The driving support device according to claim 1 further comprising a ground determination unit which determines whether or not a ground on which the vehicle is travelling is an off-road ground, wherein, if the ground is an off-road ground, the route image generation unit generates the route image.

4. The driving support device according to claim 3, wherein the ground determination unit includes a rotational velocity acquiring unit which acquires the rotational velocities of wheels provided on the vehicle, and the ground determination unit calculates the difference between the rotational velocities of every combination of two of the wheels, and if the difference of at least one of the combinations is larger than a predetermined threshold value, determines that the ground on which the vehicle is travelling is an off-road ground.

5. The driving support device according to claim 1 further comprising a forward traveling determination unit which determines whether or not a shift lever of the vehicle is set at a drive range, wherein the imaging unit includes a front imaging unit which takes a front travelling direction image by shooting in the forward direction of the vehicle, the route image generation unit, if the shift lever of the vehicle is set at the drive range, generates a front wheel route image that indicates travelling routes of front wheels of the vehicle, the superimposed image generation unit, if the shift lever of the vehicle is set at the drive range, generates a front superimposed image by superimposing the front wheel route image onto the front travelling direction image, and the image display unit, if the shift lever of the vehicle is set at the drive range, displays the front superimposed image.

6. The driving support device according to claim 1 further comprising a backward traveling determination unit which determines whether or not a shift lever of the vehicle is set at a reverse range, wherein the imaging unit includes a rear imaging unit which takes a rear travelling direction image by shooting in the backward direction of the vehicle, the route image generation unit, if the shift lever of the vehicle is set at the reverse range, generates a rear wheel route image that indicates travelling routes of rear wheels of the vehicle, the superimposed image generation unit, if the shift lever of the vehicle is set at the reverse range, generates a rear superimposed image by superimposing the rear wheel route image onto the rear travelling direction image, and the image display unit, if the shift lever of the vehicle is set at the reverse range, displays the rear superimposed image.

7. The driving support device according to claim 1, wherein the route image generation unit includes:

a straight route calculation unit which, if the steering angle is directed in the straight forward direction of the vehicle, calculates the travelling routes of the wheels as belt-like areas extending along lines that pass through the wheels and are parallel to the straight forward direction, in a virtual space where the vehicle is present;

a turning route calculation unit which, if the steering angle is directed in a direction other than the straight forward direction of the vehicle, calculates the center of a circle along which the vehicle turns, based on the steering angle, in the virtual space, and calculates the travelling routes of the wheels as belt-like areas extending along circles that pass through the wheels and are centered on the center, in the virtual space; and an image generation unit which generates the route image as seen from a viewpoint in the virtual space corresponding to the imaging unit, based on the travelling routes of the wheels calculated by the straight route calculation unit or the turning route calculation unit.

8. The driving support device according to claim 1, wherein:

the route image generation unit generates the route image to include guide lines that are drawn at positions on the image representing the traveling route of the right wheel and the image representing the traveling route of the left wheel; and the positions of the guide lines for the right and left wheels have a same distance from the end of the vehicle in the travelling direction that is shorter than the predetermined distance when the steering angle of the vehicle is directed in the straight forward direction and when the steering angle of the vehicle is directed in a direction other than the straight forward direction.

\* \* \* \* \*